US011373500B2

(12) United States Patent
Andre Dias et al.

(10) Patent No.: US 11,373,500 B2
(45) Date of Patent: Jun. 28, 2022

(54) FLUID CONTAINER WITH DIGITAL DISPLAY GIVING AN INDICATION OF THE STATE OF THE CONTAINER

(71) Applicant: L'Air Liquide, Société Anonyme pour l'Etude et l'Exploitation des Procédés Georges Claude, Paris (FR)

(72) Inventors: Sofia Andre Dias, Antony (FR); Federica Bellingeri, Paris (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 71 days.

(21) Appl. No.: 17/071,484

(22) Filed: Oct. 15, 2020

(65) Prior Publication Data

US 2021/0217287 A1 Jul. 15, 2021

(30) Foreign Application Priority Data

Jan. 14, 2020 (FR) ...................................... 2000289

(51) Int. Cl.
*G08B 21/00* (2006.01)
*G08B 21/04* (2006.01)
*G09G 3/36* (2006.01)
*H04Q 9/02* (2006.01)

(52) U.S. Cl.
CPC ........... *G08B 21/0461* (2013.01); *G09G 3/36* (2013.01); *H04Q 9/02* (2013.01); *G09G 2320/10* (2013.01);
(Continued)

(58) Field of Classification Search
CPC .. G08B 21/0461; G09G 3/36; G09G 2320/10; G09G 2380/08; H04Q 9/02; H04Q 9/00; H04Q 2209/43; H08Q 2209/86
See application file for complete search history.

(56) References Cited

U.S. PATENT DOCUMENTS 4,876,903 A * 10/1989 Budinger .............. F17C 13/003
128/204.22
4,998,438 A * 3/1991 Martin ................ B60C 23/0406
D10/86
(Continued)

FOREIGN PATENT DOCUMENTS

DE 20 2017 102 422 9/2018
EP 2 918 892 9/2015
(Continued)

OTHER PUBLICATIONS

French Search Report for corresponding FR 2000289, dated Jul. 21, 2020.

*Primary Examiner* — Ojiako K Nwugo
(74) *Attorney, Agent, or Firm* — Elwood L. Haynes

(57) ABSTRACT

The invention relates to a pressurized gas container, having an internal volume for storing gas under pressure comprising a valve for distributing fluid, a pressure sensor for measuring the pressure of the gas and delivering at least one measurement signal, a microprocessor for processing the measurement signal delivered by the pressure sensor and a digital display. The microprocessor converts the measurement signal delivered by the pressure sensor into a measured pressure value, and compares the measured pressure value with at least one preset threshold-pressure value. The digital display displays at least one predefined term reflecting the amount of gas in the container, which is dependent on the comparison performed by the microprocessor.

12 Claims, 2 Drawing Sheets

(52) U.S. Cl.
    CPC ... *G09G 2380/08* (2013.01); *H04Q 2213/002* (2013.01)

(56) References Cited

U.S. PATENT DOCUMENTS

| | | | |
|---|---|---|---|
| 10,151,405 B1* | 12/2018 | Tebebi | F17C 13/025 |
| 2004/0004165 A1* | 1/2004 | Hong | F16M 11/28 |
| | | | 248/132 |
| 2008/0150739 A1* | 6/2008 | Gamard | F17C 13/003 |
| | | | 340/626 |
| 2013/0327411 A1* | 12/2013 | Min | F25D 17/042 |
| | | | 137/565.23 |
| 2014/0111965 A1* | 4/2014 | Hogg | G01D 13/02 |
| | | | 362/23.21 |
| 2014/0130875 A1* | 5/2014 | Fowler | F17C 13/002 |
| | | | 137/557 |
| 2015/0260343 A1* | 9/2015 | Baune | F17C 13/003 |
| | | | 206/0.6 |
| 2015/0260344 A1 | 9/2015 | Frenal et al. | |
| 2016/0245426 A1* | 8/2016 | Fowler | F17C 13/025 |
| 2017/0030799 A1* | 2/2017 | Inami | H02B 13/0655 |
| 2018/0009511 A1* | 1/2018 | Kang | B63B 25/14 |
| 2020/0156857 A1* | 5/2020 | Rider | B67D 1/0412 |

FOREIGN PATENT DOCUMENTS

| | | |
|---|---|---|
| EP | 2 918 893 | 9/2015 |
| FR | 3 033 385 | 9/2016 |
| WO | WO 2017 165414 | 9/2017 |

* cited by examiner

FLUID CONTAINER WITH DIGITAL DISPLAY GIVING AN INDICATION OF THE STATE OF THE CONTAINER

CROSS REFERENCE TO RELATED APPLICATIONS

This application claims the benefit of priority under 35 U.S.C. § 119 (a) and (b) to French Patent Application No. 2000289, filed Jan. 14, 2020, the entire contents of which are incorporated herein by reference.

BACKGROUND

The invention relates to a pressurized fluid container, in particular a pressurized gas cylinder, equipped with a valve for distributing fluid comprising a digital display configured to display information on the fill level of the container in the form of a predefined term stored in memory of the type FULL or EMPTY, or the translation thereof into another language, for example into French, i.e. PLEIN or VIDE, i.e. giving an indication of the full or empty state of the container.

Pressurized fluid containers, such as pressurized gas tanks or cylinders, are commonly equipped with a valve for distributing fluid, with or without an integrated pressure-regulating system, and with a protective covering, also called a cap, which serves to protect the valve for distributing gas from impacts, falls, soiling, etc.

Thus, document EP-A-2918893 proposes a gas cylinder equipped with valve with an integrated pressure regulator or IPR protected by a rigid covering. A pressure gauge is arranged in the upper portion of the covering so as to provide the user with an indication of the pressure of the gas.

In addition, EP-A-2918892 proposes a gas cylinder equipped with an electronic display screen again here allowing the remaining gas pressure in the container to be displayed.

However, it has been observed in practice that many users consider the displaying of the gas pressure not to be a straightforward way of easily determining whether a gas cylinder is empty or full of gas. Specifically, many users find it difficult to deduce from a displayed pressure value whether a gas cylinder is suitable for use because it is full or, conversely, has to be changed because it is empty.

It is readily understood that this may lead to errors on the part of the user, such as a caregiver, and generate a risk, in particular when the gas is a medical gas, such as oxygen, that has to be administered to a patient, since an unsuitable choice of gas cylinder, for example an empty or near-empty cylinder, may result in an insufficient amount of oxygen being supplied and lead to hypoxia in the patient.

The problem is therefore that of providing a gas container, in particular a gas cylinder, equipped with a valve for distributing gas with a digital display, preferably protected by a protective covering, which does not present the problems mentioned above and allows the user to be given a clear, quick, straightforward and immediate indication as to the state of the container.

SUMMARY

The solution of the invention relates to a pressurized gas container, in particular a gas cylinder, comprising an internal volume for storing gas under pressure, comprising:

a valve for distributing gas comprising at least one internal passage for gas in fluidic communication with the internal volume of the gas container, a pressure sensor for measuring the pressure of the gas and delivering at least one measurement signal, one or more microprocessors for processing the measurement signal delivered by the pressure sensor and a digital display, and wherein:

a) the one or more microprocessors are configured to:
   convert the measurement signal delivered by the pressure sensor into a measured pressure value, and
   compare the measured pressure value with preset threshold-pressure values, said preset threshold-pressure values comprising a high threshold-pressure value ($V_H$) and a low threshold-pressure value ($V_B$), with $V_B < V_H$, b) and the digital display is configured to display:
   the term "FULL" or "PLEIN" when the microprocessor determines that the measured pressure is higher than or equal to the high threshold-pressure value ($V_H$), and
   the term "EMPTY" or "VIDE" when the microprocessor determines that the measured pressure is lower than or equal to the low threshold-pressure value ($V_B$).

Depending on the embodiment in question, the container of the invention may comprise one or more of the following features:

the digital display arranged on a housing of an electronic device.

the digital display borne by the frontal or front panel of the housing of the electronic device.

the electronic device is attached to the valve for distributing gas.

the electronic device comprises the microprocessor.

the digital display is configured to display at least one predefined term (i.e. indication or word) chosen from the predefined terms "FULL" and "EMPTY" (in English) or the translation thereof into another language, for example "PLEIN" and "VIDE" (in French) so as to give indication of the full or empty state of the container.

the one or more preset threshold-pressure values and/or the predefined terms are stored within at least one storage memory.

a plurality of preset threshold-pressure values are stored in memory.

the high threshold-pressure value ($V_H$) is higher than or equal to 100 bar, for example about 137 bar or 190 bar, as the case may be.

the low threshold-pressure value ($V_B$) is lower than or equal to 20 bar, for example about 5 to 10 bar.

the digital display is configured to display a gas pressure when the microprocessor determines that the measured pressure is between the high threshold-pressure value ($V_H$) and the low threshold-pressure value ($V_B$).

at least one electrical energy source supplies power to the digital display, the microprocessor and/or the pressure sensor.

the pressure sensor is arranged so as to measure the pressure of the gas within the internal passage for gas of the valve for distributing fluid.

the valve for distributing fluid is protected by a protective covering comprising a rigid covering body arranged around said valve for distributing fluid.

- the housing of the electronic device comprising the digital display is housed in an opening made in the covering body.
- the covering body defines an internal volume sized to house the valve for distributing gas.
- the electrical energy source comprises one or more electric batteries or cells, which may or may not be rechargeable.
- the microprocessor uses one or more algorithms.
- it comprises a circuit board on which the one or more microprocessors are arranged.
- the microprocessor is a microcontroller. More precisely, the microprocessor may be integrated into the electronic device in the form of a microcontroller.
- the microcontroller is configured to record data, in particular within software or an algorithm.
- the microcontroller is configured to record the preset threshold-pressure values, in particular a high threshold-pressure value ($V_H$) and a low threshold-pressure value ($V_B$).
- alternatively, a memory for storing data is arranged on the circuit board.
- the digital display is configured to display a graphic bar representing the gas pressure, preferably a circular arc-shaped graphic bar.
- the electrical energy source supplies power to the circuit board, in particular the microprocessor and/or the memory for storing data.
- the covering body is made of a polymer material, of metal or combinations thereof.
- the covering body comprises one or more carrying handles; preferably the carrying handle is arranged so as to surmount the covering, i.e. it is located substantially on top of the covering.
- the valve for distributing gas is a valve with an integrated pressure regulator or IPR.
- the valve for distributing fluid is made of copper alloy, such as brass.
- the covering body further comprises a securing system designed to allow it to be secured to a support, in particular to a bar of a hospital bed or to a stretcher for carrying a patient or the like.
- the covering body further comprises a movable, preferably pivoting, securing system.
- the covering body forms an overall closed three-dimensional structure comprising a plurality of openings.
- the fluid container is a pressurized gas cylinder.
- the fluid container contains a gas under pressure, in particular a medical gas, such as oxygen.
- the fluid container contains, when it is full, a gas at a pressure of at least 130 to 200 bar abs, or even at least 300 bar abs.
- the fluid container has a cylindrical, in particular ogival, general shape.
- the protective covering is arranged coaxially with the fluid container.
- the fluid container contains a gas or a mixture of gasses, such as oxygen, an $NO/N_2$, $O_2/N_2O$ or $He/O_2$ mixture, air, etc.

BRIEF DESCRIPTION OF THE DRAWINGS

The invention will now be better understood by virtue of the following detailed description, which is given by way of non-limiting illustration, and with reference to the appended figures, in which.

DETAILED DESCRIPTION OF PREFERRED EMBODIMENTS

Figure 1:
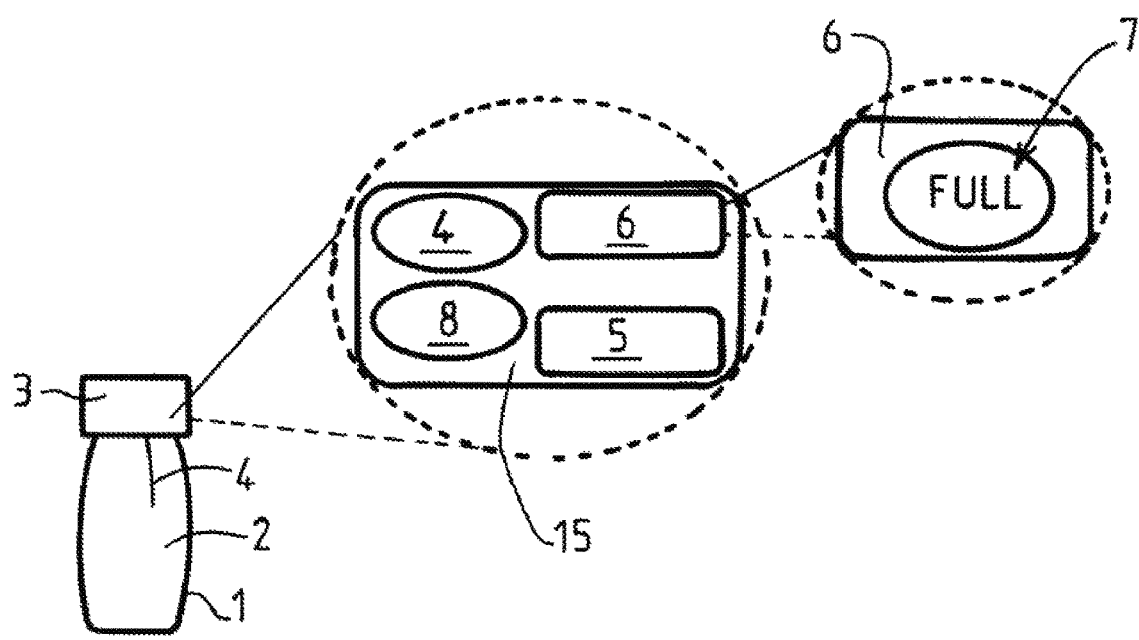
FIG. 1 schematically shows one possible architecture of a fluid container with a digital display according to the invention.

FIG. 1 schematically shows a pressurized gas container according to the invention, namely here a gas cylinder, comprising an internal volume 2 for storing gas under pressure and additionally equipped with a valve for distributing fluid 3, such as an IPR, through which there is at least one internal passage for gas in fluidic communication with the internal volume 2 of the container 1 so as to convey the gas within the valve 3.

The valve for distributing fluid 3 comprises a pressure sensor 4 for measuring the pressure of the gas, within the internal passage for gas and/or in the internal volume 2 of the container 1, and delivering at least one pressure measurement signal to at least one microprocessor 5 which is configured to process the pressure measurement signal delivered by the pressure sensor 4. The microprocessor 5 may be arranged on a circuit board.

Also provided is a digital display 6 borne by a housing of an electronic device (visible in FIG. 2 and FIG. 3) attached to the valve for distributing fluid 3, which may be housed in an opening or compartment provided in the body of a protective covering (not shown) arranged around the valve for distributing fluid 3 and serving to protect it from impacts or other possible damage, for example a rigid covering made of polymer and/or of metal.

The housing of the electronic device also comprises the microprocessor 5, typically a circuit board bearing a microcontroller.

Preferably, the fluid container 1 is a gas cylinder of axis AA comprising a cylindrical body defining the internal volume 2 for storing gas at high pressure, typically a maximum pressure of 130 to 300 bar abs, or even beyond 300 bar abs, and a neck comprising an orifice that is in communication with the internal volume 2 and allows the gas to be withdrawn from the internal volume 2 or, conversely, allows it to be filled when it is empty.

The valve for distributing fluid 3 is mounted, typically screwed, at the level of the orifice of the neck of the gas cylinder. It comprises a connector or end fitting for distributing gas to which an item of medical equipment, a flexible tube or another device using or routing the gas delivered by the valve 3 can be connected. A member for adjusting the flow rate, namely here a rotary handwheel or the like, allows a user to adjust the desired value of the gas flow rate.

It is possible to provide one or more carrying handles connected to the body of the covering and sized so as to be able to be gripped manually by a user in order to allow convenient handling and/or transport of the gas container/valve/covering assembly, and/or a movable, preferably pivoting, securing device or system that allows the gas cylinder/valve/covering assembly to be secured to a support, such as a bar of a hospital bed, to a stretcher, to a rail or the like.

The digital display 6, such as a digital screen, for example a liquid-crystal display (LCD), etc., supplied with power by a electrical energy source (not visible) arranged in the covering, for example one or more batteries or cells placed in a cell compartment made in the wall of the covering body and closed by a removable flap or the like.

According to the invention, in order to give the user a clear, quick, straightforward and immediate indication as to the state of the container 1, that is to say as to the amount of gas that it contains, the microprocessor 5 is configured to convert the measurement signal delivered by the pressure sensor 4 into a measured pressure value, and to compare this measured pressure value with one or more preset threshold-pressure values, and, in addition, the digital display 6 is configured to display a predefined term 7 that reflects the amount of gas in the container, said term being dependent on the comparison performed by the microprocessor 5, which implements in particular one or more calculation algorithms.

The one or more preset threshold-pressure values and the predefined terms 7 are stored within at least one storage memory 9 or else directly within the microprocessor 5, typically a microcontroller, for example within software implemented by said microcontroller.

In particular, the predefined terms 7 are "FULL" and "EMPTY" or the translation thereof into a language other than English, for example the translation thereof into French, namely the terms "PLEIN" and "VIDE", respectively.

Additionally, the preset threshold-pressure values comprise a high threshold-pressure value ($V_H$) and a low threshold-pressure value ($V_B$), with $V_B<V_H$, for example a high threshold-pressure value ($V_H$) higher than or equal to 100 bar, for example of about 137 bar, and a low threshold-pressure value ($V_B$) lower than or equal to 20 bar, for example approximately from 5 to 10 bar.

Figure 2:
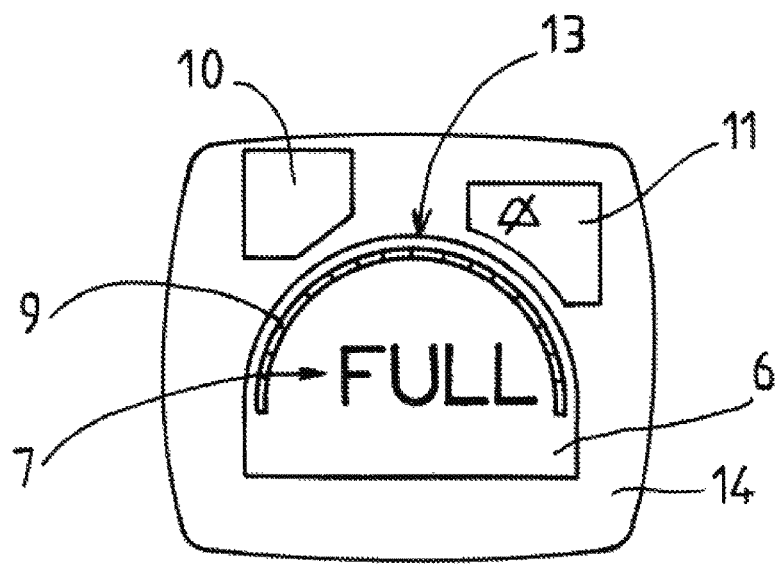
FIG. 2 shows the electronic device with a display of FIG. 1 for a fluid container according to the invention indicating that the container is "FULL" (or "PLEIN" in French)

The digital display 6 then displays the predefined term 7 "FULL", or "PLEIN" in French, when the microprocessor 5 determines that the measured pressure is higher than or equal to the high threshold-pressure value ($V_H$), as illustrated in FIG. 2, which indicates to the user immediately and in a straightforward manner that the container 1 is full or nearly full of gas and may therefore be used without risking an interruption in the supply for any significant length of time (though depending on the flow rate of course). For example, the high threshold-pressure value ($V_H$) may be equal to approximately 137 bar.

Figure 3:
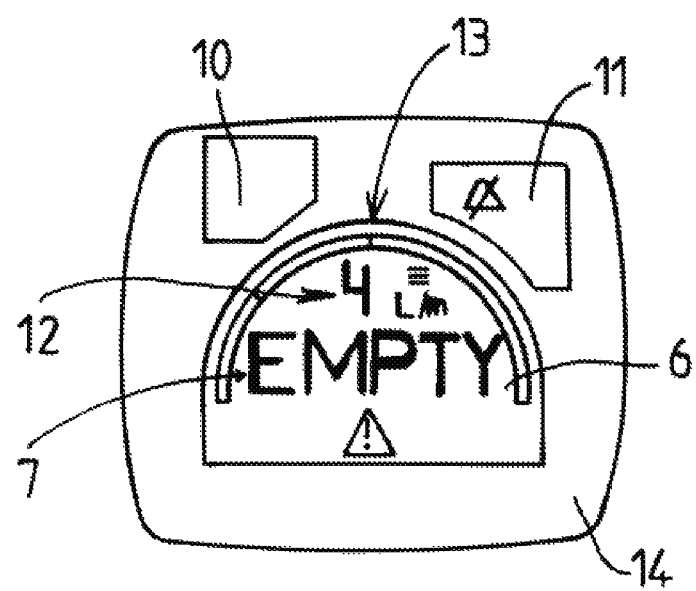
FIG. 3 shows the electronic device with a display of FIG. 1 for a fluid container according to the invention indicating that the container is "EMPTY" (or "VIDE" in French).

Conversely, the digital display 4 displays the term "EMPTY", or "VIDE" in French, as illustrated in FIG. 3, when the microprocessor 5 determines that the measured pressure is lower than or equal to the low threshold-pressure value ($V_B$), which indicates to the user immediately and in a straightforward manner that the container 1 is empty or nearly empty of gas and may therefore not be used without risking an interruption in the supply. For example, the low threshold-pressure value ($V_B$) may be approximately from 5 to 10 bar.

Lastly, when the microprocessor 5 determines that the measured pressure is higher than the low threshold-pressure value ($V_B$) but lower than the high threshold-pressure value ($V_H$), the digital display 4 displays the measured pressure value instead of the predefined terms 7.

These indications allow containers to be sorted quickly by the user by allowing them to know quickly and in a straightforward manner which ones are empty, which ones are full and which ones contain an intermediate amount of gas and to do so without the user having to have any particular knowledge in the subject and/or additionally having to perform conversions or calculations.

Advantageously, the digital display 6 also comprises, as illustrated in FIG. 1 and FIG. 2, a graphic bar 9, here in an elongated arc shape, for example in the shape of an arcing strip (i.e. a circular arc), positioned along an edge in the shape of a circular arc of the digital display 6, and serving to provide a graphic representation of the pressure, and hence of the amount of gas remaining in the cylinder 1.

Preferably, the graphic bar 9 is in color. More precisely, it comprises a plurality of successive zones of different colors (i.e. colors or shades of colors), for example white, green, red, orange, etc., which could be light or dark.

Additionally, the digital display 6 may also display one or more other items of information, for example a value of the gas flow rate 12 (in L/min or in another unit) as illustrated in FIG. 3, or else remaining gas (in hours and minutes).

More generally, the digital display 6 comprises a screen whose height is between around 29 and 37 cm, and whose width is between around 39 and 43 cm, preferably with an arc-shaped upper edge 13 along which the graphic bar 9 is displayed, as shown schematically in FIG. 2 and FIG. 3.

The digital display 6 may be arranged in the frontal panel 14, i.e. the front face, of the housing of the electronic device attached to the valve for distributing fluid 3 and housed in an opening of the body of the protective covering protecting the valve 3. The frontal panel 14 may further comprise a finger-activated button 11, i.e. a button that is activated when a user presses it using their finger, such as their index finger, and an indicator light 10, such as an LED. The button 11 may comprise a marking, such as an icon for example, like here a bell with a line through it to indicate that this button is for acknowledging an alarm.

Additionally, the indicator light 10, such as an LED, may be controlled by the microprocessor 5 so as to light up, in particular to blink, when the microprocessor 5 determines that the pressure in the container 1 is low, i.e. lower than the low threshold-pressure value ($V_B$). In other words, the lighting up (e.g. blinking) of the LED 10 may be made to occur simultaneously with displaying of the predefined term 7 "EMPTY" or "VIDE" on the display 6.

All of the components which require electrical energy to operate (i.e. microprocessor, sensor, display, etc.) are supplied with power by an electrical energy source arranged for example in the covering, for example an electric cell or battery.

Additionally, the microprocessor 5, the sensor 4, the memory 8, etc. may for their part be borne by a circuit board 15. The microprocessor is preferably a microcontroller that implements one or more calculation or other algorithms and preferably comprises an internal storage memory.

The circuit board 15 is arranged in the housing of the electronic device attached to the valve for distributing fluid 3 (not shown).

In general, a fluid container 1, in particular a gas cylinder, equipped with a valve, such as an IPR, protected by a covering according to the invention is suitable for storing and supplying gas under pressure, in particular a medical gas or mixture of gasses, such as oxygen, an $NO/N_2$, $O_2/N_2O$ or $He/O_2$ mixture, air, etc.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A pressurized gas container, comprising an internal volume for storing gas under pressure, the pressurized gas container comprising:
   a valve configured to distribute fluid comprising at least one internal passage for gas in fluidic communication with the internal volume of the gas container,
   a pressure sensor configured to measure the pressure of the gas and delivering at least one measurement signal,
   a microprocessor configured to process the measurement signal delivered by the pressure sensor and
   a digital display,
   and wherein
   the microprocessor is configured to:
      i) convert the measurement signal delivered by the pressure sensor into a measured pressure, and
      ii) compare the measured pressure value with preset threshold-pressure values, said preset threshold-pressure values comprising a high threshold-pressure value ($V_H$) and a low threshold-pressure value ($V_B$), with $V_B<V_H$,
   and the digital display is configured to display:
      a) the term "FULL" or "PLEIN" when the microprocessor determines that the measured pressure is higher than or equal to the high threshold-pressure value ($V_H$), and
      b) the term "EMPTY" or "VIDE" when the microprocessor determines that the measured pressure is lower than or equal to the low threshold-pressure value ($V_B$).

2. The container as claimed in claim 1, wherein said at least one preset threshold-pressure value and/or the predefined terms are stored in memory.

3. The container as claimed in claim 2, wherein a plurality of preset threshold-pressure values are stored in memory.

4. The container as claimed in claim 1, wherein the high threshold-pressure value ($V_H$) is higher than or equal to 100 bar.

5. The container as claimed in claim 1, wherein the low threshold-pressure value ($V_B$) is lower than or equal to 20 bar.

6. The container as claimed in claim 1, wherein the digital display is configured to display a gas pressure when the microprocessor determines that the measured pressure is between the high threshold-pressure value ($V_H$) and the low threshold-pressure value ($V_B$).

7. The container as claimed in claim 1, wherein the digital display is configured to display a graphic bar representing the gas pressure.

8. The container as claimed in claim 1, wherein the pressure sensor is arranged so as to measure the pressure of the gas within the internal passage for gas of the valve for distributing fluid.

9. The container as claimed in claim 1, wherein the digital display is arranged on a housing of an electronic device.

10. The container as claimed in claim 9, wherein the electronic device is attached to the valve for distributing gas.

11. The container as claimed in claim 9, wherein the microprocessor is arranged in the housing of the electronic device.

12. The container as claimed in claim 1, wherein a protective covering is arranged around the valve for distributing gas and the electronic device is housed in an opening made in the covering body.

* * * * *